(12) United States Patent
Siu

(10) Patent No.: US 7,803,273 B2
(45) Date of Patent: Sep. 28, 2010

(54) FILTER WITH BETTER PERFORMANCE BY MINIMIZING CLOGGING

(75) Inventor: K. W. Michael Siu, Kowloon (HK)

(73) Assignee: The Hong Kong Polytechnic University (CN)

( * ) Notice: Subject to any disclaimer, the term of this patent is extended or adjusted under 35 U.S.C. 154(b) by 0 days.

(21) Appl. No.: 11/707,195

(22) Filed: Feb. 13, 2007

(65) Prior Publication Data

US 2007/0295656 A1 Dec. 27, 2007

(30) Foreign Application Priority Data

Jun. 27, 2006 (CN) .................... 2006 2 0121341 U

(51) Int. Cl.
B01D 39/14 (2006.01)
B01D 29/03 (2006.01)

(52) U.S. Cl. ...................................... 210/232; 210/498

(58) Field of Classification Search .................. 210/232, 210/498
See application file for complete search history.

(56) References Cited

U.S. PATENT DOCUMENTS

| | | | |
|---|---|---|---|
| 1,259,048 A * | 3/1918 | Roberts et al. ........... 210/380.1 |
| 3,150,038 A * | 9/1964 | Rich ........................... 162/237 |
| 3,352,423 A * | 11/1967 | Osterman .................... 210/496 |
| 3,662,893 A * | 5/1972 | Humbert, Jr. ............... 210/315 |
| 3,812,972 A * | 5/1974 | Rosenblum ................. 210/489 |
| 4,529,519 A * | 7/1985 | Holz ..................... 210/497.01 |
| 4,529,520 A * | 7/1985 | Lampenius ................. 210/498 |
| 5,028,036 A * | 7/1991 | Sane et al. .................. 266/227 |
| 5,073,254 A * | 12/1991 | Beisenherz et al. ......... 209/273 |
| 5,234,594 A * | 8/1993 | Tonucci et al. ......... 210/500.26 |
| 5,524,770 A * | 6/1996 | LeBlanc et al. ............. 209/273 |

FOREIGN PATENT DOCUMENTS

EP 79811 A * 5/1983
WO 98/49392 A1 * 11/1998

* cited by examiner

Primary Examiner—Thomas M Lithgow
(74) Attorney, Agent, or Firm—McConnell Boehnen Hulbert & Berghoff LLP

(57) ABSTRACT

A filter comprises at least one filtration unit with a filtration passage having an inlet and an outlet, wherein the filtration unit includes at least one groove formed in an inlet side surface of the filtration unit, said at least one groove extending to the inlet and dimensioned to hold back substances which may clog the filtration passage, by means of upper edges of said at least one groove. According to the present invention, by forming at least one groove in an inlet side surface of the filtration unit, the filtration passages of the filter can be effectively prevented from being clogged.

6 Claims, 7 Drawing Sheets

FILTER WITH BETTER PERFORMANCE BY MINIMIZING CLOGGING

FIELD OF THE INVENTION

The present invention relates to a filter, and more particularly, to a filter in which filtration passages can be effectively prevented from being clogged.

BACKGROUND OF THE INVENTION

Generally, a filter is a device for holding back or trapping some unexpected substances by use of its filtration passages. However, the filtration passages of the filter or the inlets of the filtration passages might be frequently clogged by relatively large particles or pieces (including substances to be filtered away) during a filtration process, thereby deteriorating or even completely destroying filtration function of the filter. Thus, it is very important on how to reduce or avoid clogging of the filtration passages of filters. It is not wise to simply increase cross-sectional areas of the filtration passages, since the filtration performance of the filter will be degraded as the cross-sectional areas increase.

SUMMARY OF THE INVENTION

Accordingly, the present invention is directed to a filter whose filtration passages can be effectively prevented from being clogged by larger substances while not deteriorating the filtration performance of the filter.

According to an aspect of the present invention, a filter comprises at least one filtration unit with a filtration passage having an inlet and an outlet, wherein the filtration unit includes at least one groove formed in an inlet side surface of the filtration unit, said at least one groove extending to the inlet and dimensioned to hold back substances which may clog the filtration passage, by means of upper edges of said at least one groove.

According to an aspect of the present invention, the filtration passage may have a shape of cylinder with a central axis.

According to an aspect of the present invention, the number of said at least one groove is four, and the four grooves are identical straight grooves symmetrically arranged with respect to the central axis.

According to an aspect of the present invention, the filtration passage has a diameter D, and each of the grooves has a width of $(D^2/2)^{1/2}$.

According to an aspect of the present invention, the filtration passage has a diameter D, and each of the grooves has a depth of $D/2$.

According to the present invention, by forming at least one groove in an inlet side surface of the filtration unit, the filtration passages of the filter can be effectively prevented from being clogged.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings illustrate preferred embodiment(s) of the invention and serve to explain the principle of the invention together with the description. In the drawings.

DETAILED DESCRIPTION OF THE PREFERRED EMBODIMENTS

Reference will now be made in detail to the preferred embodiments of the present invention, examples of which are illustrated in the accompanying drawings.

Above all, the structure of the filter according the present invention will be described as follows.

Figure 1:
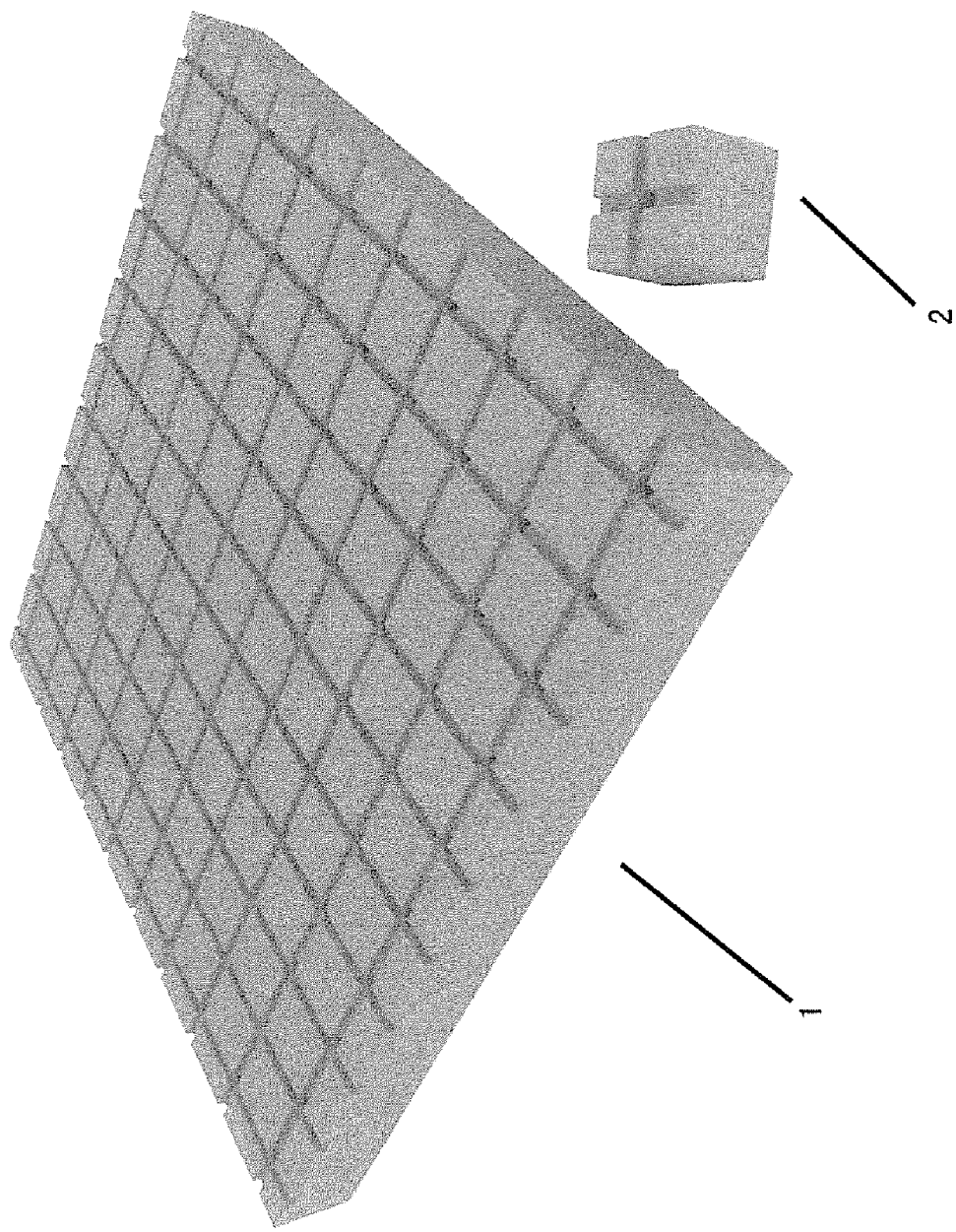
FIG. 1 is a perspective view of a filter and one filtration unit thereof according to the present invention.

As shown in FIG. 1, which is a perspective view of a filter and one filtration unit thereof according to the present invention, the filter 1 includes at least one filtration unit 2.

Figure 2:
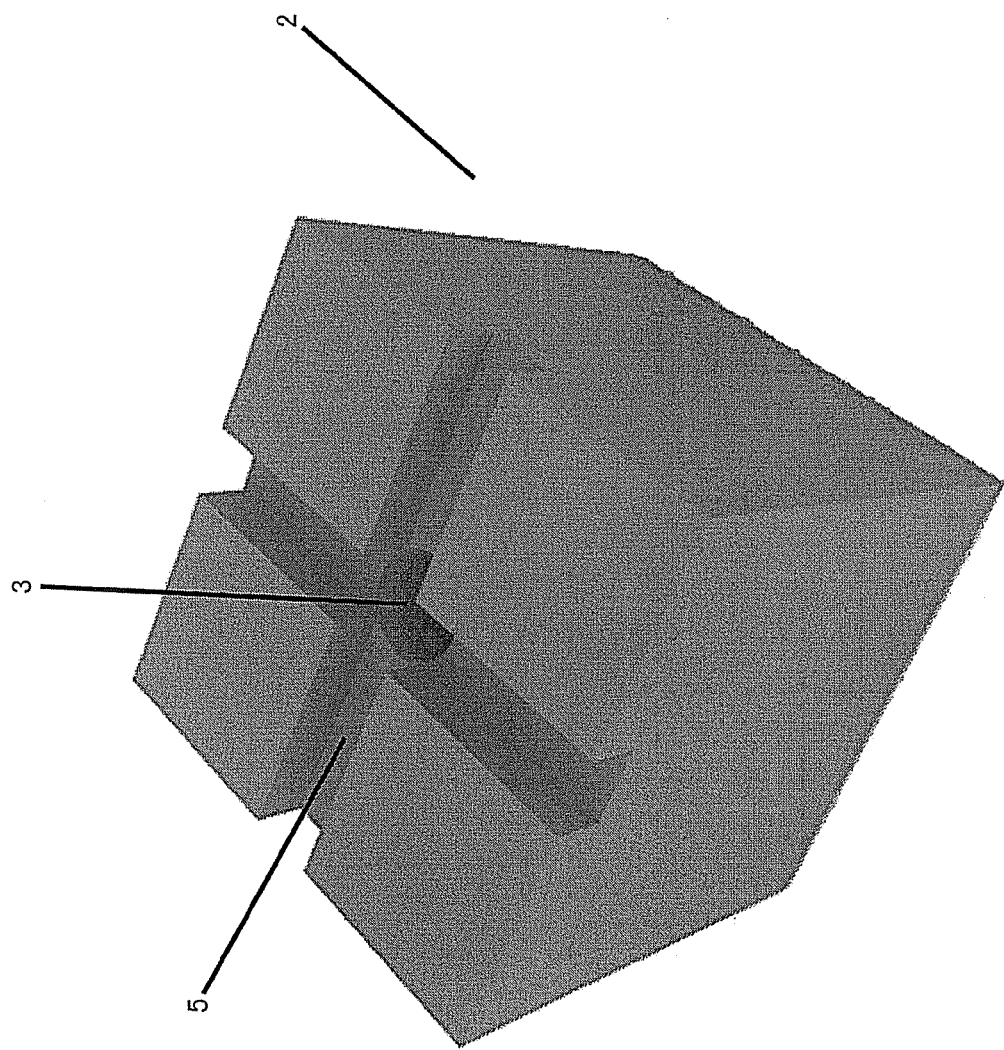
FIG. 2 is an enlarged perspective view illustrating the filtration unit shown in FIG. 1.
Figure 3A:
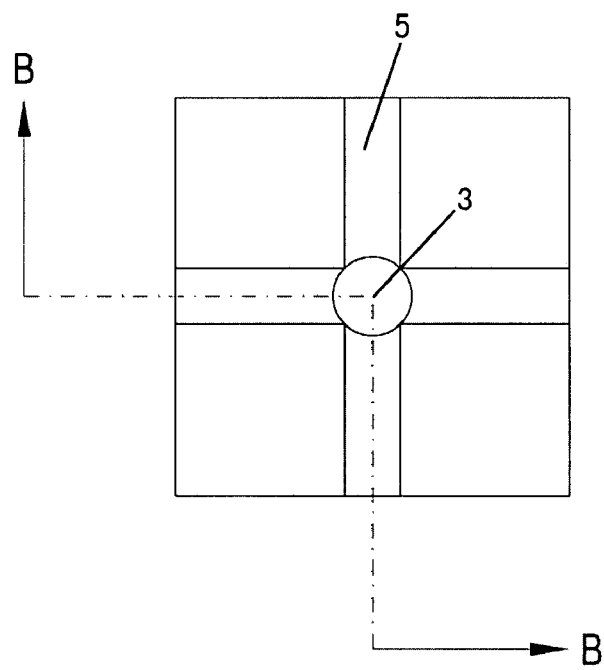
FIG. 3a is a top view of the filtration unit shown in FIG. 2.
Figure 3B:
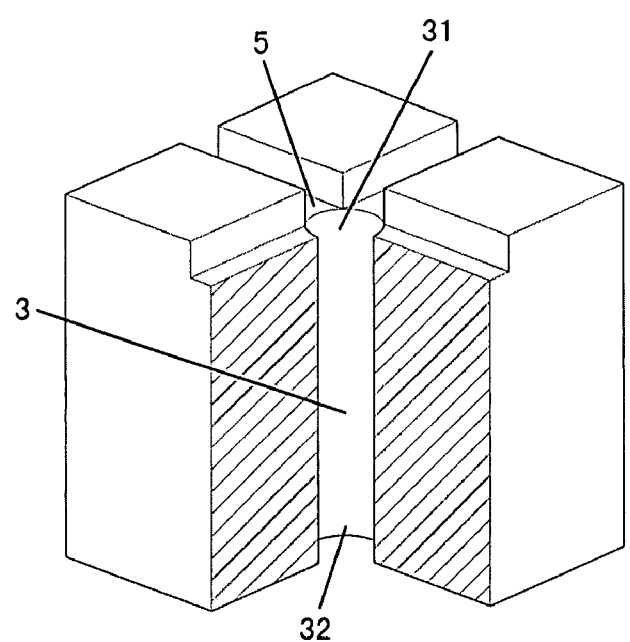
FIG. 3b is a perspective sectional view taken along line B-B in FIG. 3a, schematically illustrating the construction of the filtration unit.

As shown in FIGS. 2-3b, the filtration unit 2 is provided with a filtration passage 3 functioning to filter away undesired substances during a filtration process. The filtration passage 3 has an inlet 31 and an outlet 32. Preferably, the filtration passage 3 has a shape of cylinder shown in the drawings. However, there is no limit to the shape of the filtration passage 3.

In an inlet side surface of the filtration unit 2, i.e. the side surface opposite to the outlet 32, at least one groove 5 extending to the inlet 31 is provided. In case of a plurality of grooves, they are preferably identical grooves symmetrically arranged with respect to a central axis of the filtration passage. In the preferred embodiment illustrated in the drawings, there are four identical straight grooves symmetrically arranged with respect to the central axis of the filtration passage. However, in the invention, there is no specific limitation to the number of the grooves. In addition, the groove 5 can have various shapes and can be formed in any known manner.

Hereinafter, the function of these grooves 5 will be described in detail with reference to FIG. 3c, which is a perspective sectional view schematically illustrating an anti-clogging principle of the filter with the grooves according to the present invention. In the drawings, the substances in need of undergoing a filtration process are assumed to be substantially sphere-shaped particles.

Figure 3C:
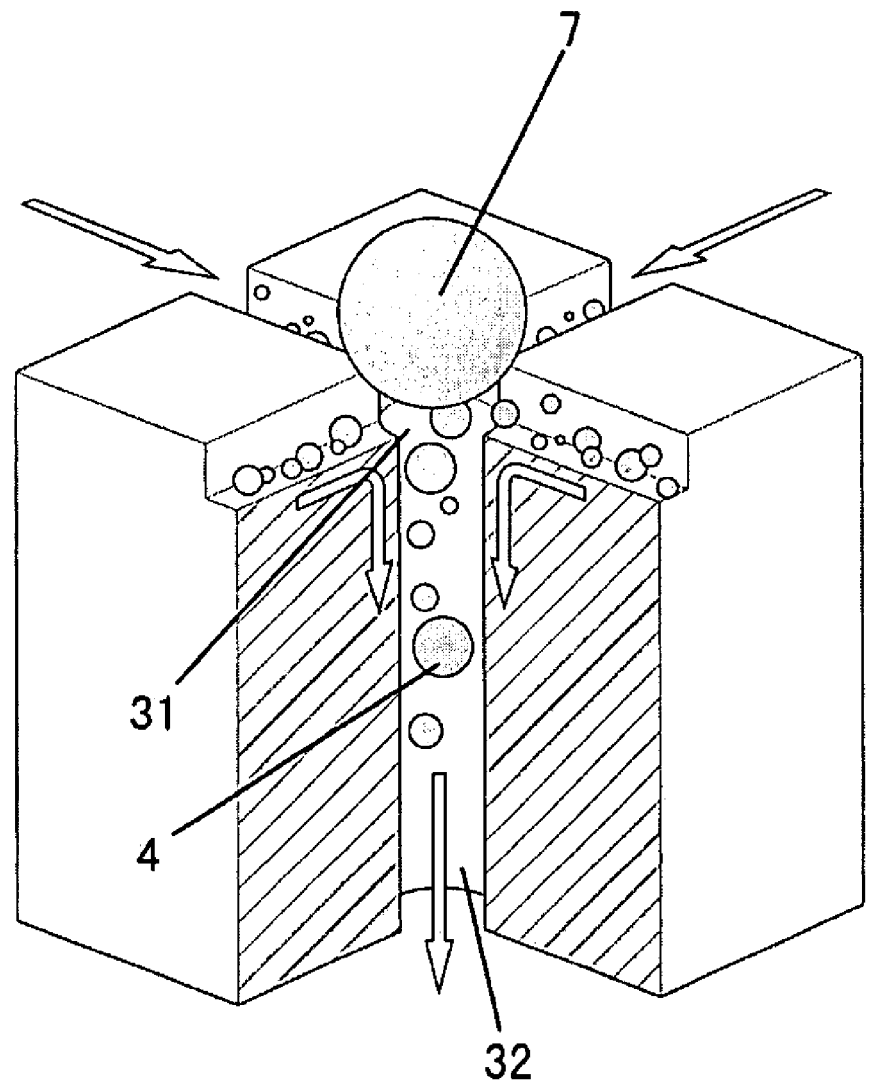
FIG. 3c is a perspective sectional view similar to FIG. 3b, schematically illustrating the anti-clogging principle of the filtration unit according to the present invention.

As shown in FIG. 3c, by means of such a configuration of the filter, relatively large particles or pieces 7 (including substances to be filtered away) which may clog the filtration passage 3 or block the inlet 31 are held back by upper edges of grooves 5 and thus can neither clog the filtration passage 3 nor block the inlet 31. In contrast, relatively small particles or pieces 4 are allowed to enter into the filtration passage 3.

Thus, the clogging of the filtration passage or the inlet thereof is minimized. Consequently, perfect filtration efficiency can be maintained and a perfect performance of the filter can be achieved. Accordingly, the object of the invention is accomplished.

To ensure such an anti-clogging effect, the grooves 5 should be properly sized so that relatively large particles or pieces 7 (including substances to be filtered away) will be held back or trapped by means of the upper edges of the grooves 5.

Hereinafter, take the filtration unit 2 including four grooves 5 as an example to describe dimensions of the grooves 5 and the filtration passage 3.

Figure 4A:
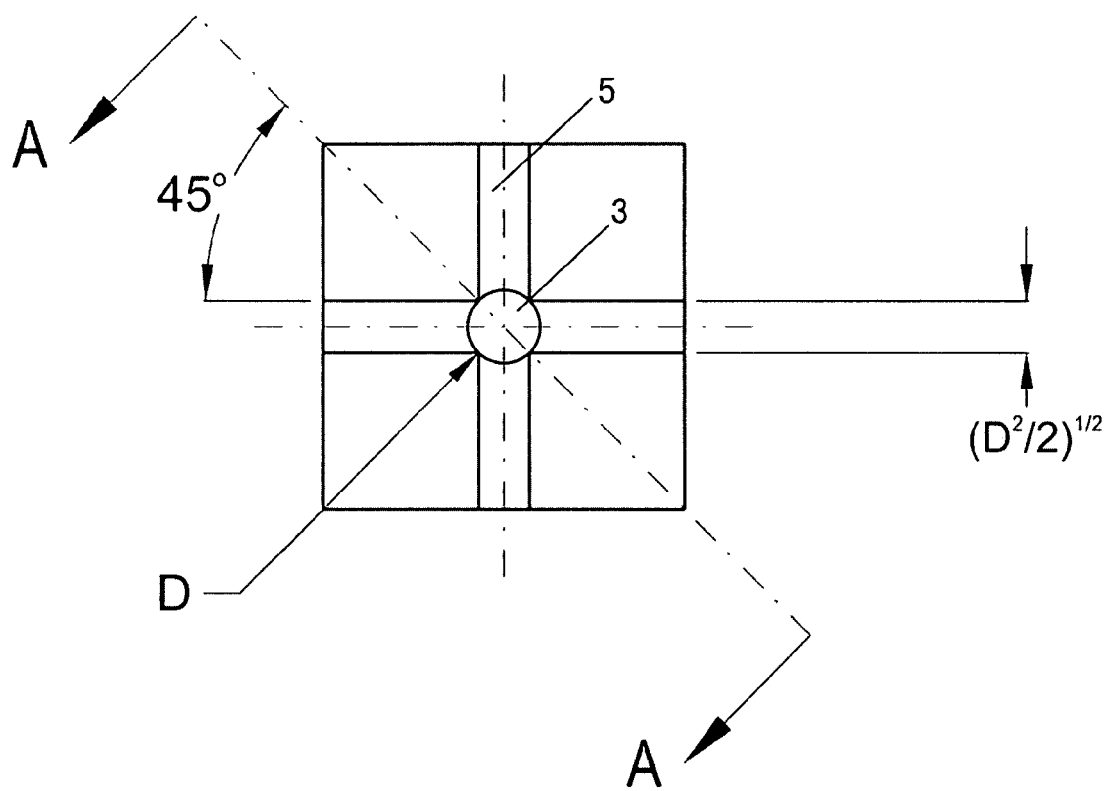
FIG. 4a is a top view of the filtration unit shown in FIG. 2, illustrating a preferred width of the groove according to a preferred embodiment of the present invention.
Figure 4B:
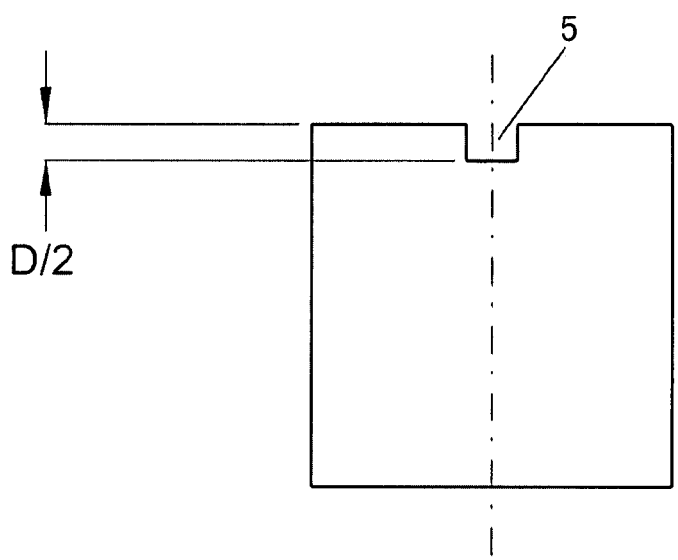
FIG. 4b is a front view of the filtration unit shown in FIG. 2, illustrating a preferred depth of the groove according to the preferred embodiment of the present invention.
Figure 4C:
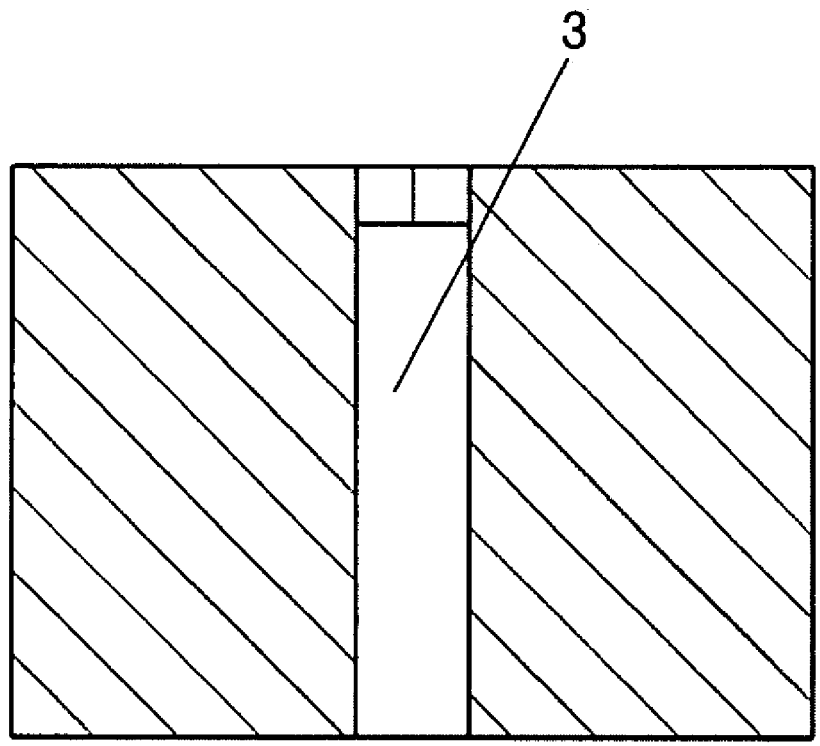
FIG. 4c is a sectional view taken along line A-A shown in FIG. 4a of the filtration unit.

FIGS. 4a-4c illustrate some preferred dimensions.

Figure 5A:
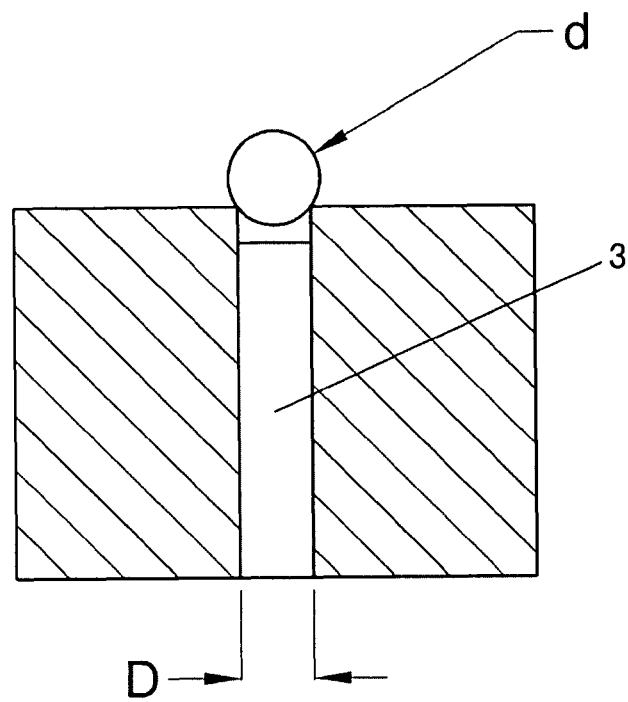
FIG. 5a illustrates a case where a diameter d of a particle is larger than the diameter D of the filtration passage in the preferred embodiment of FIGS. 4a-4c.
Figure 5B:
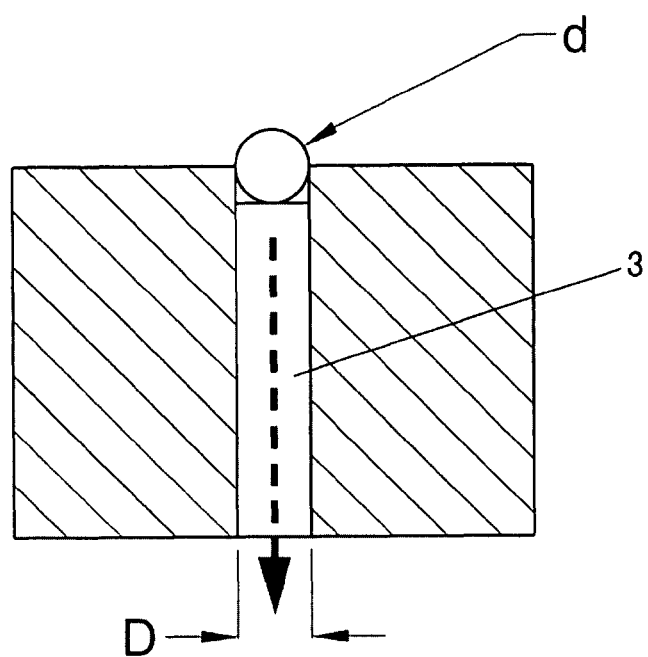
FIG. 5b illustrates a case where the diameter d of a particle is not larger than the diameter D of the filtration passage in the preferred embodiment of FIGS. 4a-4c.

The filtration passage 3 has a cylindrical shape and its inlet has a diameter D. Four grooves 5 are symmetrically arranged with respect to the center axis of the filtration passage 3. Preferably, a width of each groove 5 is $(D^2/2)^{1/2}$. With such a width, the four grooves can hold back those particles or pieces with a diameter larger than D, so as to effectively prevent the inlet of the filtration passage 3 from being blocked and prevent the filtration passage 3 from being clogged. In the case of each groove 5 with a width of $(D^2/2)^{1/2}$, as shown in FIG. 5a, the particle having a diameter d larger than D will be held back by upper edges of the grooves 5 and may not enter into the filtration passage 3. In contrast, the particle having a diameter d not larger than D may enter into the filtration passage 3, as shown in FIG. 5b.

In addition, the groove 5 may have a depth of D/2.

In fact, there is no specific limitation to the dimensions of the grooves 5 and the filtration passage 3. According to the spirit of the present invention, the grooves 5 and the filtration passage 3 may be suitably dimensioned so as to prevent the filtration passage 3 or the inlet 31 from being clogged or blocked by relatively large particles or pieces 7 (including substances to be filtered away).

It will be apparent to those skilled in the art that various modifications and variations can be made in the present invention without departing from the spirit or scope of the invention. Thus, it is intended that the present invention covers the modifications and variations of this invention provided they fall into the scope of the appended claims and their equivalents.

What is claimed is:

1. A filter comprising more than one filtration unit, each filtration unit being provided with a filtration passage having an inlet and an outlet, wherein each filtration unit includes at least one groove formed in an outside surface of the filtration unit, said at least one groove extending to the inlet and dimensioned to hold back substances which may clog the filtration passage, by means of upper edges of said at least one groove wherein the filtration passage has a diameter D, and each of the grooves has a width of $(D^2/2)^{1/2}$ wherein the filter is a single layer filter.

2. The filter according to claim 1, wherein the filtration passage has a shape of cylinder with a central axis.

3. The filter according to claim 2, wherein the number of said at least one groove is four, and the four grooves are identical straight grooves symmetrically arranged with respect to the central axis.

4. The filter according to claim 3, wherein the filtration passage has a diameter D, and each of the grooves has a depth of D/2.

5. The filter according to claim 1 wherein each of the at least one grooves are in fluid communication with one another.

6. The filter according to claim 1 wherein the at least one grooves include essentially parallel side walls.

* * * * *